United States Patent
Takahashi et al.

(10) Patent No.: US 6,213,067 B1
(45) Date of Patent: Apr. 10, 2001

(54) CONTROL DEVICE FOR INTERNAL COMBUSTION ENGINE

(75) Inventors: Tatsuhiko Takahashi; Takeshi Kawakami, both of Kobe; Atsuko Hashimoto; Hirofumi Ohuchi, both of Tokyo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/439,280

(22) Filed: Nov. 15, 1999

(30) Foreign Application Priority Data

Jun. 28, 1999 (JP) .................................................. 11-181148

(51) Int. Cl.⁷ .................................................. F02B 77/08
(52) U.S. Cl. ..................................... 123/90.15; 123/90.17
(58) Field of Search ............................ 123/90.15, 90.16, 123/90.17, 90.18

(56) References Cited

U.S. PATENT DOCUMENTS

| | | | | |
|---|---|---|---|---|
| 5,462,022 | * | 10/1995 | Ushida | 123/90.17 |
| 6,006,707 | * | 12/1999 | Ito | 123/90.15 |
| 6,041,647 | * | 3/1999 | Matsuoka | 73/116 |

FOREIGN PATENT DOCUMENTS 7-180565    7/1995   (JP) .

* cited by examiner

*Primary Examiner*—Weilun Lo
(74) *Attorney, Agent, or Firm*—Sughrue, Mion, Zinn, Macpeak & Seas, PLLC

(57) ABSTRACT

A control device for an internal combustion engine includes a crank angle detecting device, which detects the crank angle of the internal combustion engine; a cam angle detecting device, which is installed in a variable cam shaft which variably rotates with respect to a crank shaft and detects a cam angle; a device for generating a cylinder identifying signal, which is separately located from the cam angle detector and generates the cylinder identifying signal, which identifies cylinders of the internal combustion engine; a device for varying valve timing, which varies the cam angle with respect to the crank angle; a valve timing controller, which controls the varying valve timing device; and a mechanism for controlling the internal combustion engine even when the cam angle detecting device is troubled because a control of supplying fuel and igniting is based on an identification of the cylinders by a signal from the device for generating the cylinder identifying signal.

5 Claims, 4 Drawing Sheets

CONTROL DEVICE FOR INTERNAL COMBUSTION ENGINE

BACKGROUND OF THE INVENTION

1. Field of the Invention

The present invention relates to a control device for an internal combustion engine which controls a fuel, ignition, valve timing of at least one of an intake valve and an exhaust valve, and so on.

2. Discussion of Background

A conventional technique is disclosed in, for example, JP-A-7-180565. It discloses a means for detecting a cam angle with respect to a crank angle to identify cylinders based on a signal of the cam angle and to detect the cam angle, i.e. valve timing.

FIG. 5 illustrates a structure of a device according to the conventional technique.

Numerical reference 1 designates an internal combustion engine. Numerical reference 2 designates an air cleaner for purifying an air taken in by the internal combustion engine 1. Numerical reference 3 designates an air flow sensor, which measures the amount of the air taken in by the internal combustion engine 1. Numerical reference 4 designates a throttle valve, which adjusts the amount of the air taken in and controls an output of the internal combustion engine 1. Numerical reference 5 designates a throttle sensor, which detects an opening degree of the throttle valve. Numerical reference 6 designates an intake pipe. Numerical reference 7 designates an injector for supplying a fuel in conformity with the amount of the taken air. Numerical reference 8 designates an ignition plug for generating a spark, which burns a mixed air in a combustion chamber of the internal combustion engine 1. Numerical reference 9 designates an exhaust pipe, which exhausts a burned exhaust gas. Numerical reference 10 designates an $O_2$ sensor, which detects the amount-of remaining oxygen in the exhaust gas. Numerical reference 11 designates a catalytic converter rhodium (CCRO), which can simultaneously purify THC, CO, and $No_x$, being a noxious gas in the exhaust gas.

Numerical reference 12 designates a sensor plate for detecting the crank angle, which is attached to a crank shaft and is integrally rotated along with the crank shaft. Numerical reference 13 designates a crank angle sensor for detecting a position of the crank shaft, which crank angle sensor generates a signal when a protrusion (not shown) of the sensor plate 12 passes through the crank angle sensor 13 to detect the crank angle. Numerical reference 14 designates a sensor plate for detecting the cam angle; and numerical reference 15 designates a cam angle sensor, which generates a signal when a protrusion (not shown) of the sensor plate 14 passes through the cam angle sensor 15 to detect the cam angle in a similar manner to that in the crank angle sensor. Numerical reference 16 designates an oil control valve for controlling a phase of a cam shaft with respect to the crank shaft by switching an oil pressure to an actuator for varying a cam phase (not shown), which oil control valve is attached to the cam shaft. Numerical reference 17 designates an engine control unit (hereinbelow, referred to as ECU), which controls the phase of the cam shaft with respect to the crank shaft and also controls the fuel and the ignition of the internal combustion engine 1. Numerical reference 18 designates an ignition coil.

An operation of the conventional device will be described with reference to FIG. 6.

An output from the crank angle sensor 13 is formed such that a raise and drop occur at a predetermined position of the crank angle to enable detection of the crank angle. The cam angle sensor 15 is provided such that a signal is generated at a predetermined crank angle. However, the cam angle sensor 15 does not generate a signal to identify a particular cylinder, whereby the fuel, the ignition, and so on are subjected to a sequential control based on information of the above signal.

In FIG. 6, numerical reference 100 designates a difference between a raise of a signal from the crank angle sensor and a drop of a signal from the cam angle sensor. By this difference, an angle of cam shaft, i.e. valve timing, with respect to the crank shaft is detected. The ECU 17 operates a target valve timing in response to a current running condition based on various sensor outputs, and conducts a feedback control based on a deflection between the target valve timing and the detected actual valve timing in order to control the oil control valve 16 so that the actual valve timing conforms to the target valve timing.

However, the conventional device has problems that valve timing is not controlled and cylinders are not identified in case that a cam angle sensor, by an output from which the cylinders are identified and variable valve timing is controlled, is troubled, whereby a sequential control of a fuel and ignition is impossible and the fuel and the ignition are not controlled in conformity with a running condition of the engine.

Further, in the conventional device, there are problems that actual valve timing is not detected for a predetermined cylinder and a performance of controlling valve timing is not improved because an output from the cam angle sensor is not generated for the predetermined cylinder.

SUMMARY OF THE INVENTION

It is an object of the present invention to solve the above-mentioned problems inherent in the conventional technique and to provide a control device for an internal combustion engine which continues to control the engine even when a cam angle sensor is troubled.

Further, another object of the present invention is to improve an accuracy of controlling valve timing by detecting actual valve timing for each cylinder.

Further, another object of the present invention is to reduce the number of components by giving a function of a means for generating a signal of identifying a cylinder to a means for detecting the crank angle and to enable to accurately detect valve timing.

Further, another object of the present invention is to improve a capability of preventing the engine from stopping by reducing an overlap of valve timing when a cam angle sensor is troubled.

Further, another object of the present invention is to improve a control of valve timing by generating a cam angle signal on a descending side of a cam.

According to a first aspect of the present invention, there is provided a control device for an internal combustion engine comprising: a means for detecting a crank angle, which detects an crank angle of the internal combustion engine; a means for detecting a cam angle, which is provided in a cam shaft variable with respect to a crank shaft; a means for generating a cylinder identifying signal of the internal combustion engine, which is provided separately from the means for detecting the cam angle; a means for changing valve timing, which changes a cam angle with respect to the crank angle; a means for controlling valve timing, which controls the means for changing the valve timing; and a means for controlling the internal combustion engine.

According to a second aspect of the present invention, the means for detecting the cam angle generates a detection signal of the cam angle for each cylinder of the combustion engine.

According to a third aspect of the present invention, the means for generating the cylinder identifying signal generates a signal for a predetermined cylinder different from those in the other cylinders and is included in the means for detecting crank angle provided for the cam shaft connected to the crank shaft.

According to a fourth aspect of the present invention, a means for detecting trouble is further equipped to detect a trouble in the means for detecting the cam angle, which means reduces an overlap of valve timing when it is troubled.

According to a fifth aspect of the present invention, the means for detecting the cam angle generates a signal on a descending side of the cam.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

A detailed explanation will be given of preferred embodiments of the present invention in reference to FIGS. 1 through 6 as follows, wherein the same numerical references are used for similar portions and a description of these portions is omitted.

Embodiment 1

Figure 1:
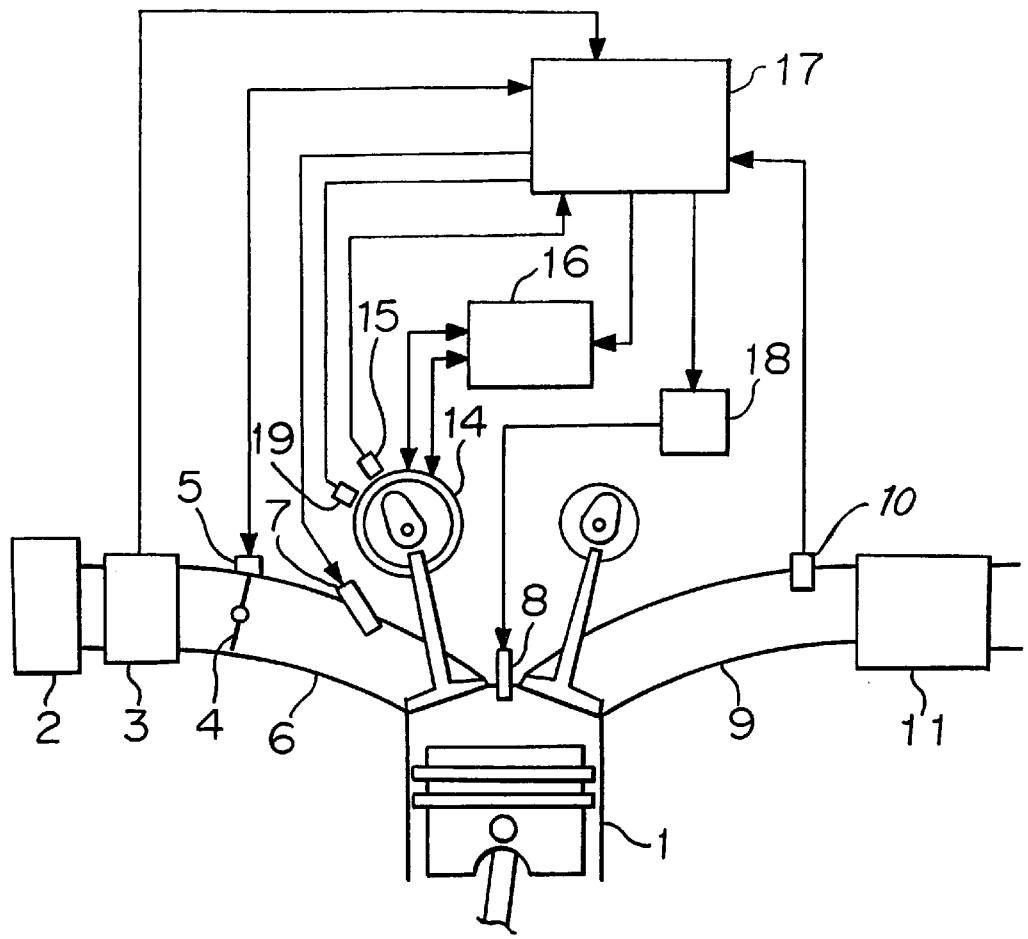
FIG. 1 illustrates a structure of a control device for an internal combustion engine according to the present invention.

FIG. 1 illustrates a structure according to the present invention. A cam shaft includes a fixed portion, rotating along with a crank shaft, and a variable portion, of which phase is changed with respect to the crank shaft. In comparison with a conventional device illustrated in FIG. 5, a crank angle sensor 19 is installed in the fixed portion of the cam shaft to generate a signal of detecting a crank angle.

When only valve timing on an intake side is changed, the crank angle sensor 19 may be attached to on a side of exhaust, where a phase is not controlled with respect to the crank shaft. Further, in case that valve timing of only one of intake and exhaust is variably controlled, the crank angle sensor 19 may be attached to a cam shaft on a side where the valve timing is not variably controlled.

ECU 17 detects the crank angle and identifies a cylinder based on an output from the crank angle sensor 19. ECU 17 constitutes a means for controlling the valve timing and a means for controlling an internal combustion engine.

Figure 2:
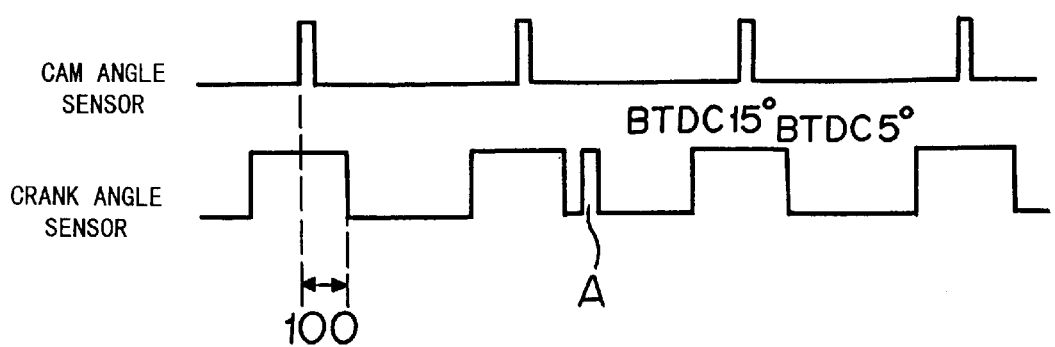
FIG. 2 is a timing chart explaining an operation of the control device for the internal combustion engine according to an embodiment of the present invention.

The crank angle sensor 19 generates a signal illustrated in FIG. 2, the signal is raised at 75° before a top dead center (BTDC75°) of a crank angle, and dropped at 5° before the top dead center (BTDC5°). Further, a portion A in FIG. 2 is attached to the signal for identifying cylinders, wherein the cylinders are specified by existence of the signal.

The crank angle sensor 19 works as a means for detecting the crank angle and a means for generating a cylinder identifying signal.

The signal for identifying the cylinders is not limited to an additional signal such as the portion A of FIG. 2. It is also possible to identify the cylinders by making one of the crank angle signals longer than the other crank angle signals so as to raise at 75° before the top dead center (BTDC75°) and drop at 5° after the top dead center (ATDC5°).

It is also possible to adopt other methods irrespective of modes of the method as long as the cylinders can be identified.

In the next, a control of the internal combustion engine in use of the above-mentioned crank angle sensor 19 will be described.

Figure 3:
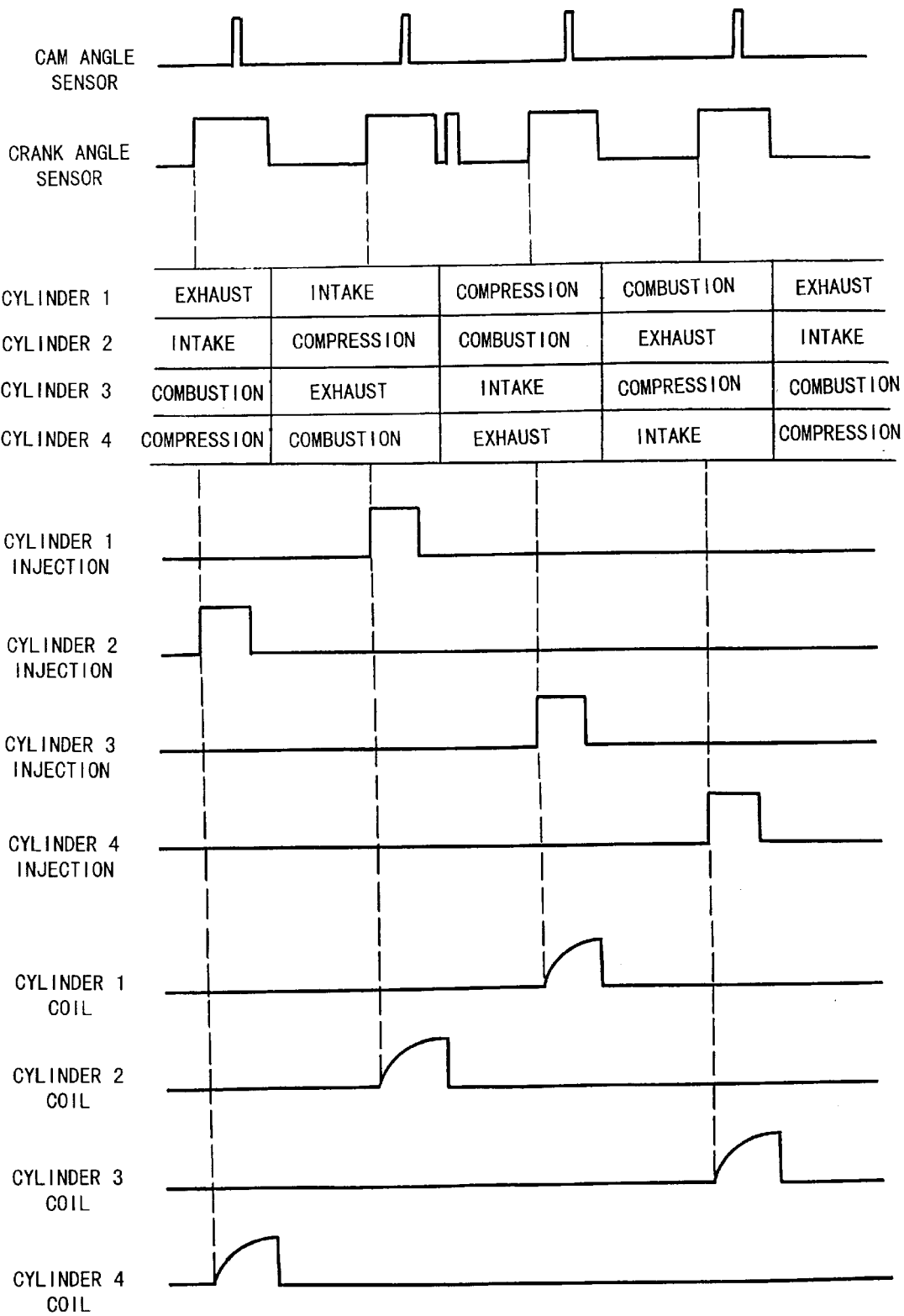
FIG. 3 is a timing chart explaining an operation of the control device for the internal combustion engine according to the embodiment of the present invention.

An air flow sensor 3 measures the amount of an air taken in by the internal combustion engine 1. The amount of a fuel, being in conformity with the quantity of air, is operated by ECU 17 to actuate an injector 7. As illustrated in FIG. 3, the cylinders are identified based on the signal from the crank angle sensor 19, and an injector 7 provided in the cylinder in an intake stroke is turned on at time of a raise of the signal of the crank angle sensor 19, being 750 before the top dead center of the crank angle, to start to supply a fuel. The injector 7 is attached to each of the cylinders so as to inject the fuel toward an intake valve. By turning on the injector 7 for a time of supplying the fuel, of which quantity corresponds to the quantity of air, the injector 7 is turned off to stop to supply the fuel. The supplied fuel is mixed with an air in an intake pipe 6 to be a mixed air, is sucked into a cylinder in the intake stroke, is compressed by the raise of a piston, and is ignited by an ignition plug 8 in the vicinity of the top dead center to burn the mixed air, whereby the internal combustion engine 1 generates an output. The ignition plug 8 is ignited by controlling to apply electricity to an ignition coil 18 by ECU 17. The ECU 17 starts to apply electricity to the ignition coil 18 at a position, where an crank angle sensor is raised at BTDC75° of a cylinder under a compression stroke, which cylinder is identified by the signal of identifying the cylinders from the crank angle sensor 19 and the electricity to the ignition coil 18 is cut at predetermined ignition timing in conformity with a running condition of the internal combustion engine, whereby the ignition plug 8 is ignited and the mixed air in the combustion chamber are burned.

Thus, by sequentially supplying the fuel and controlling ignition at appropriate timing respectively for the cylinder in response to strokes of intake, compression, combustion, and exhaust of the internal combustion engine 1, it is possible to sufficiently demonstrate an engine performance.

In the next, a control of variable valve timing will be described. Although an example of controlling the valve timing on an intake side will be described, this invention may be used for controlling the valve timing on not only the intake side but also the exhaust side.

Further, although in this example, a method of varying the valve timing is a method of varying a phase, it is not limited to this method.

In an internal combustion engine, in which valve timing is fixed, a rotation of a crank shaft is transmitted through a timing belt, a timing chain, or the like to a pully, a sprocket, or the like, whereby a cam shaft, rotating along with the pully, the sprocket, or the like, is rotated.

On the contrary, in a system of varying the valve timing, an actuator as a means for varying the valve timing, in which a relative position of a crank shaft and a cam shaft can be changed, is attached in place of a pully, a sprocket, or the like to enable a control the valve timing.

Figure 4:
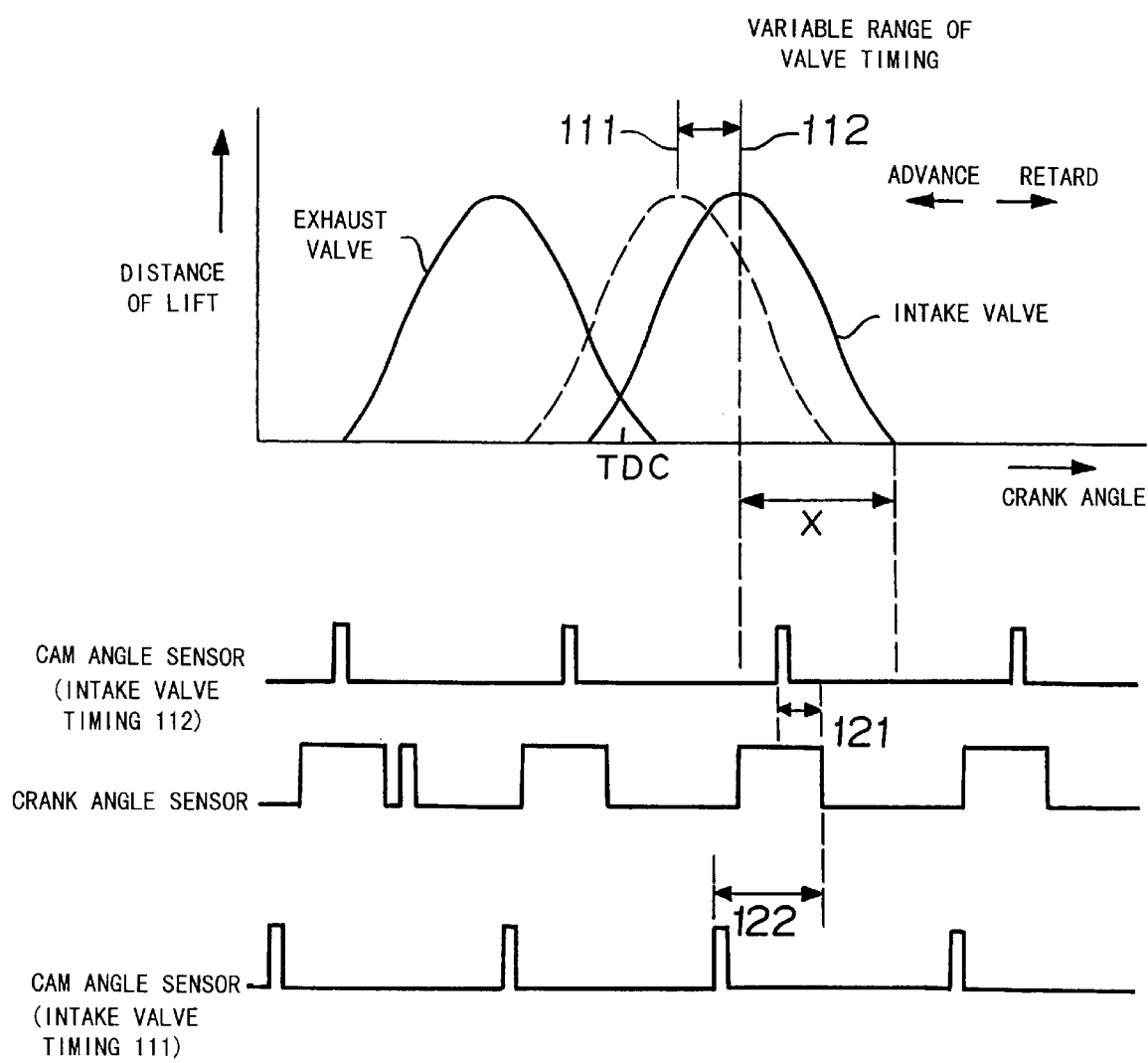
FIG. 4 is a timing chart explaining an operation of the control device for the internal combustion engine according to the embodiment of the present invention.
Figure 5:
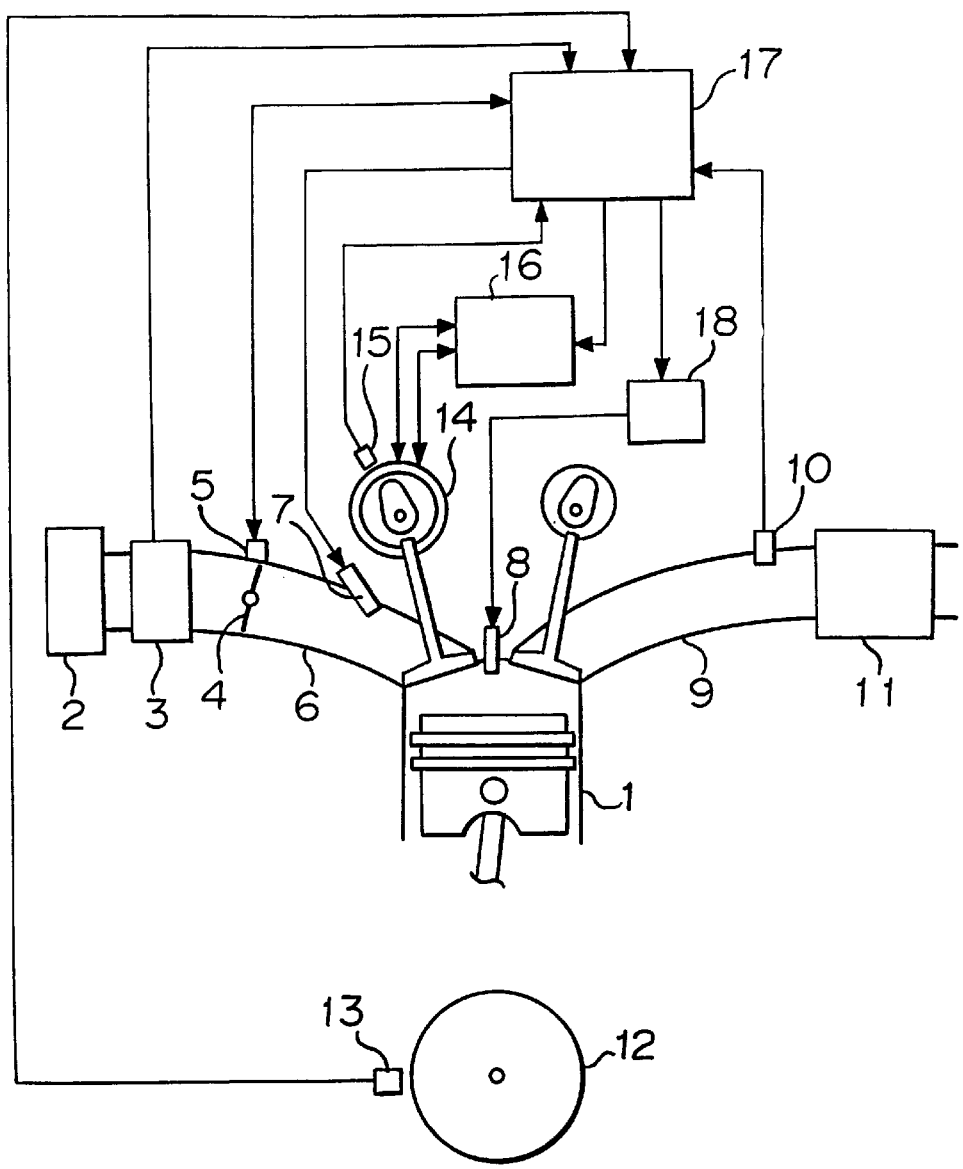
FIG. 5 illustrates a structure of a conventional control device for an internal combustion engine.
Figure 6:
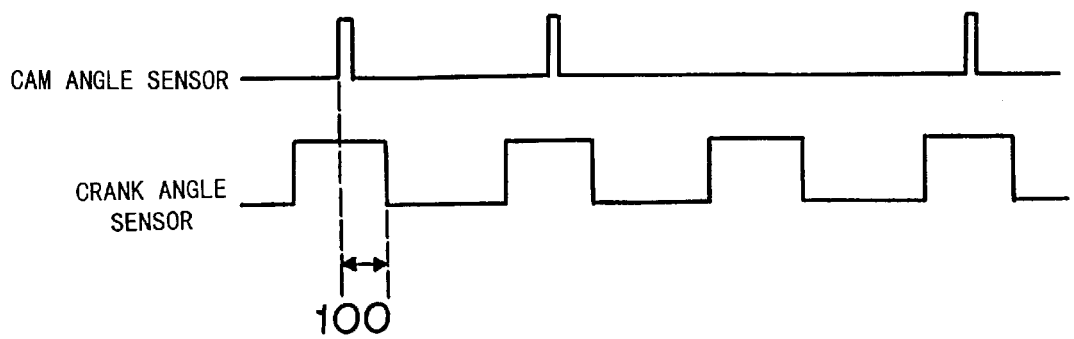
FIG. 6 is a timing chart explaining an operation of the conventional control device for the internal combustion engine.

In FIG. 4, the valve timing can be changed between numerical reference 111 and 112, whereby numerical reference 111 designates a maximumly retarded position, in which the valve timing is settled at a position where a valve overlap is mechanically minimum, and numerical reference 112 designates a maximumly advanced position, in which the valve timing is settled at a mechanically maximum valve overlap.

The valve timing is advanced by controlling the amount of the valve overlap to be large, and on the contrary, the valve timing is retarded by controlling the amount of the valve overlap to be small.

It is possible to control the valve timing at an arbitrary position within the above-mentioned range.

The actuator for varying the valve timing is driven by an oil pressure for lubricating the internal combustion engine 1 and controls the oil pressure to the actuator by an oil control valve 16, whereby the valve timing is controlled.

The phase of the cam shaft with respect to the crank shaft is detected by an output signal from the crank angle sensor 19 and an output signal from the cam angle sensor 15 as a means for detecting cam angle, which varies along with the actuator.

In FIG. 4, a phase is detected by operating a difference between a dropping position of the signal of the crank angle sensor 19 in BTDC5° and a raising position of the signal of the cam angle sensor 15. Numerical reference 121 designates a difference between the dropping position of the crank angle sensor 19 and the raising position of the cam angle sensor 15 in case that the valve timing is in the maximumly retarded position 111. Numerical reference 122 designates a difference between the dropping position of the crank angle sensor and the raising position of the cam angle sensor 15 in case that the valve timing is in the maximumly advanced position 112. The valve timing can be controlled at an arbitrary intermediate position within a movable range of the valve timing. Therefore, a difference between the dropping position of the signal of the crank angle sensor 19 and the raising position of the signal of the cam angle sensor 15 is an arbitrary difference corresponding to the valve timing within a range of 121 through 122.

The ECU 17 detects a running condition of the internal combustion engine 1 based on various sensor outputs, operates the valve timing most suitable for the running condition, and makes the most suitable valve timing a target value.

Further, the ECU 17 conducts a feedback control so that actual valve timing detected by the cam angle sensor 15 and crank angle sensor 19 coincides with the target value to control the valve timing at an arbitrary position.

In this, a case that the cam angle sensor 15 is troubled by some reasons and a normal output signal is not generated will be described. Abnormality of the cam angle sensor 15 is that a signal is not generated for a predetermined period, or the signal is settled in a high level, whereby such abnormality is detected by a means for detecting failure (not shown).

In case that the cam angle sensor 15 is troubled and an output therefrom becomes abnormal, because it is not possible to detect the actual valve timing, a mechanism of varying the valve timing can not be controlled.

In this case, it is necessary to fix the valve timing at a certain position. In this case, the maximumly retarded position having the minimum amount of the valve overlap is used in consideration of a capability of avoiding an engine stop even though an output performance of the internal combustion engine 1 is sacrificed to a certain extent.

On the other hand, because the cylinders are identified by an additional signal of the crank angle sensor 19, provided separately from the cam angle sensor 15, for controlling the fuel and the ignition of the internal combustion engine 1, it is possible to normally control without an influence of the cam angle sensor.

As described, according to Embodiment 1, a cylinder of the internal combustion engine 1 is identified by an additional signal, attached to an output from the crank angle sensor 19. Accordingly, the output signal from the cam angle sensor 15 detects only the cam angle (valve timing) for controlling the valve timing, although the valve timing can not be controlled in case of a trouble in the cam angle sensor, a control of the fuel and the ignition of the internal combustion engine 1 can be normally subjected to a sequential control, whereby it is possible to prevent a running condition of the engine from being deteriorated and the engine from being inoperable.

In Embodiment 1, the cam angle signals are generated in response to all of the cylinders indicated by the crank angle sensor 19, as illustrated in FIG. 2. Accordingly, actual valve timing for specific cylinder can be detected, unlike the conventional device which is unable to detect actual valve timing of a specific cylinder (see FIG. 6), wherein controllability of the valve timing can be improved by detecting the actual valve timing for all of the cylinders.

Further, although it is also possible to use a plurality of signals without removing the cam angle signal for the specific cylinder, a degree of freedom in designing is narrowed because an arrangement of spaces for signal generating devices becomes difficult by an increased number of the signals.

Accordingly, as illustrated in FIG. 2, the cam angle signals are generated for all of the cylinders, and each of the cam angle signals is separately generated, whereby controllability of the valve timing is improved and the degree of freedom in designing is increased.

Further, because the cam angle sensor 15 and the crank angle sensor 19 are located in the cam shaft, it is possible to accurately detect a phase of the cam shaft with respect to the crank shaft.

Further, although in Embodiment 1 the number of components in decreased by using the crank angle sensor 19 having functions of both the means for detecting the crank angle and the means for generating the cylinder identifying signal, wherein crank angle sensor identifies the cylinders by generating an additional signal A, it is also possible to generate a signal corresponding to the additional signal A using another sensor, which is further separately provided as the means for generating the cylinder identifying signal.

Embodiment 2

In Embodiment 1, it has been described that a phase of a cam shaft is detected by a positional relationship between the dropping position of the signal of the crank angle sensor 19 and the raising position of the signal of the cam angle sensor 15. Because the cam shaft is driven by a power source from the crank shaft through the timing belt, the chain, or the like, it is desirable that there is no play of the timing belt, the chain, or the like for reducing a scattering of detection.

Although, in general, the timing belt, the chain, or the like is always tensed without a play by a tensioner, it is more preferable that an output signal from the cam angle sensor 15 is generated in a section of X from starting to open a valve and finishing to close the valve, i.e. a dropping side of a cam, illustrated in FIG. 4. In this case, an accuracy of detecting is improved because the cam pushes down the valve to tense the timing belt, the chain, or the like.

The first advantage of the control device for the internal combustion engine according to the present invention is that the internal combustion engine is controlled even though the cam angle sensor is troubled.

The second advantage of the control device for the internal combustion engine according to the present invention is that an accuracy for controlling the valve timing is improved.

The third advantage of the control device for the internal combustion engine according to the present invention is that the valve timing is accurately detected.

The fourth advantage of the control device for the internal combustion engine according to the present invention is that the capability of preventing the engine from stopping is improved when the cam angle sensor is troubled.

The fifth advantage of the control device for the internal combustion engine according to the present invention is that the valve timing is correctly detected.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for an internal combustion engine comprising:

a means for detecting a crank angle, which detects the crank angle of the internal combustion engine;

a means for detecting a cam angle, which is installed in a variable cam shaft, which variably rotates with respect to a crank shaft and detects the cam angle;

a means for generating a cylinder identifying signal which is included in said means for detecting a crank angle and which is separately installed from said means for detecting the cam angle, and generates the cylinder identifying signal for identifying cylinders of the internal combustion engine;

a means for varying valve timing, which varies the cam angle with respect to the crank angle;

a means for controlling the valve timing, which controls said means for varying the valve timing; and a means for controlling the internal combustion engine.

2. The control device for the internal combustion engine according to claim 1, wherein said means for detecting the cam angle generates a detection signal of the cam angle respectively for the cylinders of the internal combustion engine.

3. The control device for the internal combustion engine according to claim 1, wherein said means for detecting the cam angle generates a signal on a descending side of a cam.

4. A control device for the internal combustion engine comprising:

a means for detecting a crank angle, which detects the crank angle of the internal combustion engine;

a means for detecting a cam angle, which is installed in a variable cam shaft, which variably rotates with respect to a crank shaft and detects the cam angle;

a means for generating a cylinder identifying signal, which is separately installed from said means for detecting the cam angle and generates the cylinder identifying signal for identifying cylinders of the internal combustion engine;

a means for varying valve timing, which varies the cam angle with respect to the crank angle;

a means for controlling the valve timing, which controls said means for varying the valve timing;

a means for controlling the internal combustion engine; and a means for detecting a trouble, which detects the trouble of said means for detecting the cam angle and reduces an overlap of valve timing of valves when said means for detecting the cam angle is troubled.

5. A control device for the internal combustion engine comprising:

a means for detecting a crank angle, which detects the crank angle of the internal combustion engine;

a means for detecting a cam angle, which is installed in a variable cam shaft, which variably rotates with respect to a crank shaft and detects the cam angle;

a means for generating a cylinder identifying signal, which is separately installed from said means for detecting the cam angle and generates the cylinder identifying signal for identifying cylinders of the internal combustion engine;

a means for varying valve timing, which varies the cam angle with respect to the crank angle;

a means for controlling the valve timing, which controls said means for varying the valve timing; and a means for controlling the internal combustion engine, wherein said means for generating the cylinder identifying signal generates a signal for a predetermined cylinder, wherein the signal is different from signals for the other cylinders, and said means for generating the cylinder identifying signal is included in said means for detecting the crank angle, installed in a fixed cam shaft, which is fixedly interlocked with the crank shaft.

* * * * *